E. S. STANLEY AND C. B. GAY.
COCK AND VALVE.
APPLICATION FILED JULY 7, 1920.

1,378,492. Patented May 17, 1921.

Witness:
Oscar F. Hill

Inventors:
Edward Sanford Stanley
Carleton Bosworth Gay
By Chas. F. Randall
Attorney.

UNITED STATES PATENT OFFICE.

EDWARD SANFORD STANLEY AND CARLETON BOSWORTH GAY, OF WHITMAN, MASSACHUSETTS, ASSIGNORS OF ONE-FIFTH TO CHARLES S. SMITH, OF LINCOLN, MASSACHUSETTS, ONE-FIFTH TO FRED H. WHITE, OF CHARLOTTE, NORTH CAROLINA, AND ONE-FIFTH TO ERNEST CLARK, OF ABINGTON, MASSACHUSETTS.

COCK AND VALVE.

1,378,492.      Specification of Letters Patent.      Patented May 17, 1921.

Application filed July 7, 1920. Serial No. 394,527.

*To all whom it may concern:*

Be it known that we, EDWARD SANFORD STANLEY and CARLETON BOSWORTH GAY, citizens of the United States, residing at Whitman, in the county of Plymouth, State of Massachusetts, have invented a certain new and useful Improvement in Cocks and Valves, of which the following is a specification, reference being had therein to the accompanying drawings.

The invention is an improvement in cocks and valves of the class having provisions for automatically sealing the passages thereof when the usual movable valve-members are removed, as in order to permit regrinding, cleaning, etc., so as by such sealing to prevent the escape of fluid or gas through the said passages in the absence of the said movable valve-members; and for automatically unsealing the said passages when the movable valve-members are replaced.

The invention comprises a cock or valve having, in addition to a main screw-threaded movable valve-member, a screw-threaded auxiliary movable valve- or sealing-member for coöperation with the entrance to the fluid or gas passage, detachably connected with the main movable valve-member to rotate in unison therewith, and screwing into open position as the main movable valve-member is closed against its seat, and into closed position as the main movable valve-member is separated abnormally far from its seat. Aside from such changes and additions as are required to be made in applying the invention, the general construction, etc., of a cock or valve in which the invention is embodied may be as heretofore or as preferred.

In the drawings,—

Figure 1:
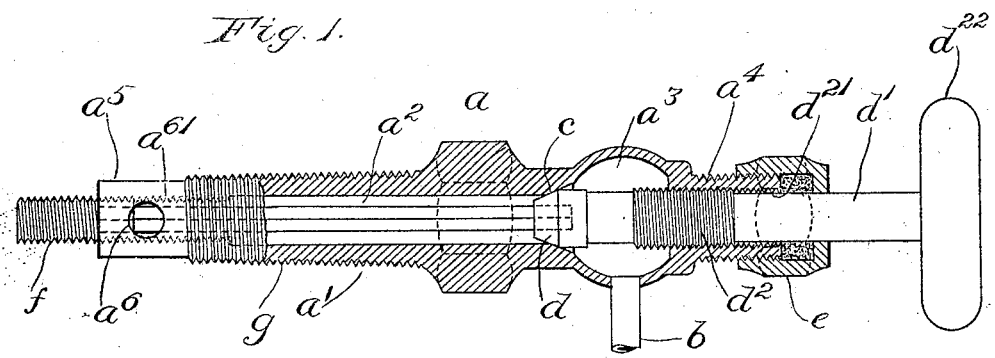
Figure 1 is a partly sectional side view of a cock or valve containing an illustrative embodiment of our invention.
Figure 2:
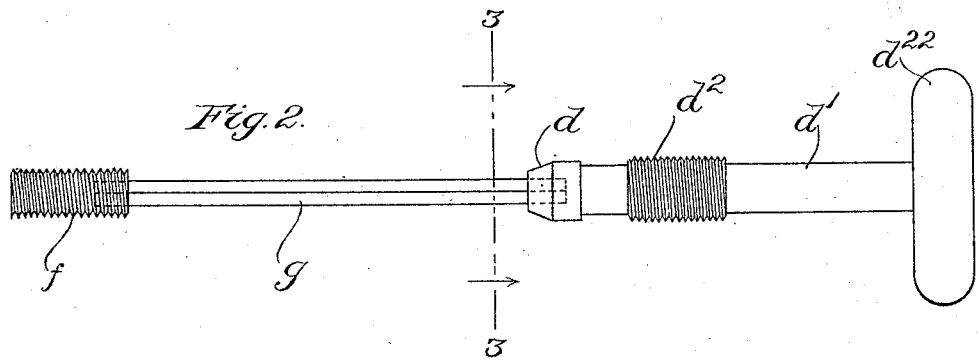
Fig. 2 shows the main and auxiliary movable valve-members, and the intermediate key which causes the auxiliary member to turn in unison with the main member.
Figure 3:
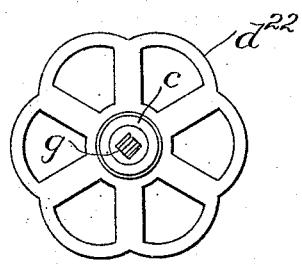
Fig. 3 is a view in cross-section on line 3, 3, of Fig. 2.

The body $a$, having the intermediate portion $a'$ of its length externally screw-threaded for convenience in attaching the cock or valve to the place where it is applied for use, has also the internal longitudinal fluid or gas passage $a^2$ and chamber $a^3$, and has applied to it the discharge pipe $b$, the bore of which communicates with the said chamber. At $c$ is an internal tapering valve-seat at the junction of the passage $a^2$ with the chamber $a^3$, and $d$ is the main movable valve-member, it having a conical acting portion for coöperation with the said tapering valve-seat $c$. The stem $d'$ of the said valve-member has as usual an external screw-thread $d^2$, which engages with the internal screw thread $d^{21}$ of the portion $a^4$ of the body $a$ beyond the chamber $a^3$. The said stem is shown provided with a hand-wheel $d^{22}$, for convenience in turning the valve-member $d$ in screwing it home against the valve-seat $c$ or away therefrom. At $e$ is the usual internally threaded stuffing-box or gland which is screwed upon the external thread of the portion $a^4$ of the body.

As thus far described, the construction is old and in itself is not of our invention.

In the case of this embodiment, the prolongation $a^5$ of the valve-body is formed with one or more lateral holes $a^6$ affording communication with the longitudinal passage $a^2$ and constituting one or more entrances therefor. The wall of the passage is screw-threaded at and adjacent the said lateral holes or entrances $a^6$, at both sides of the latter, the direction of the internal screw-thread $a^6$ preferably being the same as that of the internal thread $d^{21}$ of the portion $a^4$ of the valve-body; and the pitch preferably (though not necessarily in all cases) being the same. This portion of the passage is occupied by the auxiliary movable valve-member $f$ coöperating with the entrance or entrances $a^6$, said auxiliary valve-member being in the form of a short externally screw-threaded cylindrical rod.

Detachable connection of the auxiliary movable valve-member $f$ with the main movable valve-member $d$ is established by means of a key $g$ in the form of a short rod or spindle of non-circular cross-section, preferably square as shown, having its ends seated in key-seats of corresponding cross-section formed in the movable valve-members. By means of the key the auxiliary valve-member $f$ is caused to turn in unison with the main valve-member $d$, so that when the latter is turned by hand the auxiliary valve-member is turned also. When the external screw-threads of the two movable valve-members are alike in pitch, as preferred in practice, the auxiliary valve-member will move lengthwise to the same extent as the main movable valve-member, in either direction according to the direction in which the latter is turned, without disengagement of the valve-members and key from one another. In a case in which the said screw-threads differ in direction or pitch, the key-sockets in the valve-members will be deep enough to allow for sliding engagement between the two valve-members and the intermediate key without disengagement.

The proportions of the parts and relative location of the entrance opening $a^6$ are such that when main valve-member $d$ is in contact with valve-seat $c$ the auxiliary valve-member $f$ is clear or substantially clear of the entrance $d^6$. When valve-member $d$ is turned by hand to screw it away from valve-seat $c$, in order to permit flow of fluid or gas through the cock or valve, auxiliary valve-member $f$ is screwed toward the entrance $a^6$ and may partly close the latter, but the usual extent of opening movement of valve-member $d$ is not sufficiently great to bring about movement of the auxiliary valve-member far enough to materially obstruct or close entrance $a^6$. When valve-member $d$ is turned reversely to close it against the valve-seat again the auxiliary valve-member $f$ is screwed away from the said entrance. When, however, the main valve-member $d$ is unscrewed farther than ordinarily is required, the auxiliary valve-member will be shifted far enough to close said entrance. This may be accomplished without completely removing the main valve-member, or after unscrewing and detaching the stuffing-box or gland $e$ so as to permit the said main valve-member to be screwed completely out of the valve-body and removed. This removal may be effected without removal of the key from the valve-body. Subsequent reëngagement of the main movable valve-member with the key may be effected readily in replacing the former, the reëngagement being facilitated by having the outer end of the key project into the space inclosed within the tapering valve-seat $c$.

The shape in cross-section of the key and of the key-seats in the two movable valve-members may be varied. If preferred, the key may be fixedly connected with one of said valve-members, and the construction otherwise admits of more or less modification in practice.

What is claimed as the invention is:—

1. In a cock or valve, the combination with a body having a passage therethrough, an entrance to said passage, and a valve-seat, and a main movable valve-member in screw-threaded engagement with said body, of an auxiliary screw-threaded movable valve-member coöperating with said entrance, and a key in detachable engagement with said movable valve-members, through which the auxiliary valve-member is turned in unison with the main movable valve-member, and by means of which the auxiliary valve-member is screwed into open position as the main movable member is screwed into normal working relation with respect to its seat, and whereby the auxiliary member is screwed into closed position when said main member is screwed abnormally far from said seat, as in effecting removal thereof.

2. In a cock or valve, the combination with a body having a passage therethrough, an entrance to said passage, and a valve-seat, and a main movable valve-member in screw-threaded engagement with said body and having a non-circular key-seat at its inner end, of an auxiliary screw-threaded movable valve-member coöperating with said entrance and also having a non-circular key-seat, and a key intermediate said movable valve-members and having its ends engaged with the respective key-seats, whereby the auxiliary valve-member is turned in unison with the main movable valve-member so that it is screwed into open position as the main movable member is screwed into normal working relations with respect to its seat, and is screwed into closed position by the operation of screwing the said main member abnormally far from said seat, in effecting removal thereof.

3. The combination, in a cock or valve, with a main screw-threaded movable valve-member, of a screw-threaded auxiliary movable valve or sealing member for coöperation with the entrance to the passage through the valve, detachably connected with the main movable valve-member to rotate in unison therewith, screwing into open position as the main movable valve-member is closed against its seat and into closed position as the main movable valve-member is separated abnormally far from its seat.

In testimony whereof we affix our signatures, in presence of two witnesses.

EDWARD SANFORD STANLEY
CARLETON BOSWORTH GAY

Witnesses:
  EDGAR CLIFFORD MONROE,
  JOHN EDWIN BUTLER.